(12) United States Patent
Berenbaum et al.

(10) Patent No.: US 9,015,437 B2
(45) Date of Patent: Apr. 21, 2015

(54) EXTENSIBLE HARDWARE DEVICE CONFIGURATION USING MEMORY

(75) Inventors: Alan Berenbaum, New York, NY (US); Uri Segal, Farmingdale, NY (US)

(73) Assignee: SMSC Holdings S.A.R.L., Hauppauge, NY (US)

( * ) Notice: Subject to any disclaimer, the term of this patent is extended or adjusted under 35 U.S.C. 154(b) by 382 days.

(21) Appl. No.: 13/406,533

(22) Filed: Feb. 28, 2012

(65) Prior Publication Data

US 2013/0227235 A1     Aug. 29, 2013

(51) Int. Cl.
*G06F 12/00* (2006.01)
*G06F 3/06* (2006.01)
*G06F 12/06* (2006.01)
*G06F 13/20* (2006.01)

(52) U.S. Cl.
CPC .......... *G06F 3/0679* (2013.01); *G06F 12/0646* (2013.01); *G06F 13/20* (2013.01); *G06F 12/06* (2013.01)

(58) Field of Classification Search
CPC ....... G06F 13/20; G06F 3/0679; G06F 12/06; G06F 12/0646

USPC .......................................................... 711/163
See application file for complete search history.

(56) References Cited

U.S. PATENT DOCUMENTS

| | | | |
|---|---|---|---|
| 6,810,446 B1 * | 10/2004 | Brelin et al. .................... 710/36 |
| 2002/0144027 A1 * | 10/2002 | Schmisseur ..................... 710/22 |
| 2005/0060441 A1 * | 3/2005 | Schmisseur ..................... 710/22 |
| 2009/0113114 A1 * | 4/2009 | Berenbaum et al. .......... 711/103 |
| 2010/0174845 A1 * | 7/2010 | Gorobets et al. .............. 711/103 |

* cited by examiner

*Primary Examiner* — Brian Peugh
*Assistant Examiner* — Prasith Thammavong
(74) *Attorney, Agent, or Firm* — King & Spalding L.L.P.

(57) ABSTRACT

The present disclosure provides a system and method for implementing extensible hardware configuration using memory. A memory containing an Info Block is provided. The Info Block contains a set of descriptors, which comprises an address part and a data part. The OTP Engine reads each valid descriptor stored in the Info Block, and writes the data in the data part into the memory location specified by the address part. The OTP Engine interacts with the Info Block by accessing the Info Block Controller registers via the central system bus.

18 Claims, 5 Drawing Sheets

EXTENSIBLE HARDWARE DEVICE CONFIGURATION USING MEMORY

TECHNICAL FIELD

This disclosure relates generally to the field of System-on-chip (SoC) devices, and more specifically to an implementation of versatile one time programmable memory.

BACKGROUND

Recent advances in integrated circuit technology have led to the proliferation of System-on-chip (SoC) architectures, which integrate all or nearly all necessary electronic circuits of diverse functions onto a single chip. Having various parts and components fabricated on a single chip, a SoC is well suited to function as a final product itself. Accordingly, SoCs are widely used in the area of embedded systems.

SoC can be designed to operate in different markets and environments, but in operation, it is often configured for a specific application. In other words, actual functions of a SoC are limited by some forms of configurations means, even though the SoC is capable of performing a variety of additional functions. An embedded controller (EC) in a SoC often uses non-volatile flash memory to store program information as well as data. A typical flash intellectual property (IP) block often contains an extra block or two of memory, sometimes called an Info Block, which the IP vendors propose as usable for storing configuration data. In this setting, the EC reads the Info Block and updates registers of the SoC according to a firmware stored in the main flash body or possibly in a Read Only Memory (ROM). At a lower configuration level, however, some functions of the SoC must be configured prior to the EC and the firmware configures the SoC. Such pre-firmware execution configurations, which are not controlled by the firmware, include: (1) trimming analog functions such as Analog-Digital Converters or oscillators; (2) managing security information such as a serial number; and (3) restricting hardware/software functionality of the device for product differentiation purposes or other reasons. These low-level configurations are typically stored in One-Time Programmable (OTP) memories implemented in a programmable read only memory (e.g., PROM) or a non-volatile memory (OTP NVM). Such devices may be written or programmed once, and then further steps are taken to prevent them from being reprogrammed or erased afterward.

While a typical OTP memory can provide an effective tamper-proof configuration mechanism, that solution has several drawbacks. First, an OTP memory, being a special purpose memory block purchased from an IP vendor, increases a SoC's total bill of material (BOM). Moreover, incorporating an OTP memory in a SoC often requires a more expensive process. Increase in functionality of SoCs usually requires larger configuration data, which inevitably adds even more OTP memory associated cost. Second, a typical OTP memory can be programmed only once. That limitation makes laboratory or field experimentations difficult, because any changes in the configuration parameters require a new device. Also, a SoC's configuration requirement can change after the SoC or the device employing the SoC is fabricated. For example, design changes may dictate that some SoC components to be disabled for changed power requirements or the like. In some cases, reconfiguration is needed to enable and disable features as part of a product differentiation scheme. In these scenarios, a typical OTP memory cannot adapt to SoC design changes or to revised configuration data.

Further, configuring a SoC entirely with EC firmware is insecure. An unscrupulous user can modify the firmware to bypass the configuration limitations that restrict access to features usable only in higher priced versions, for example. Also, unstable firmware or a problem during firmware update process may render the device permanently inoperable.

Attempts have been made to solve these problems. For example, emulating one-time programmability using a flash memory has been described in the U.S. Pat. No. 7,991,943, titled "Implementation of One Time Programmable Memory with Embedded Flash Memory in a System-on-Chip". Such solutions are designed for a particular SoC for a particular application, however, and those solutions are often very difficult to adapt to configuration requirement changes.

Thus, there remains a need for a system and a method for implementing extensible hardware device configuration that can adapt to varying configuration requirements.

SUMMARY

One embodiment of the present disclosure is a method for implementing extensible hardware device configuration using memory. The method includes configuring an Info Block Controller, via a central system bus, to permit access to an Info Block. The Info Block is organized with a sequence of descriptors, each containing an address part and a data part for configuring the device as well as enforcing the one-time programmability feature on the Info Block. The central system bus interconnects all components in the system, thereby allowing all registers to be accessible in a single address space. The method also includes obtaining a memory address and a data from the address part and the data part, respectively, from each valid descriptor. The obtained data is latched or otherwise written to the corresponding memory address. The method further includes configuring the Info Block Controller to prohibit subsequent writes to the Info Block. In some embodiments, unauthorized components are held in reset prior to permitting access to the Info Block, and they are released from reset after a write protection mechanism is engaged on the Info Block.

Another embodiment in the present disclosure relates to a system for implementing extensible hardware device configuration using memory. The system comprises a central system bus for connecting all components of the system, in which the central system bus has a single memory address space. The system also comprises a memory containing an Info Block. The Info Block is organized with a sequence of descriptors. Each descriptor contains an address part and a data part that are used in configuring the device/system. In addition, an Info Block Controller is coupled to the central system bus, and it contains at least one control bit in at least one register for controlling access to the Info Block, and at least one write-once bit for controlling a write-protection policy on the Info Block. Furthermore, the system includes an OTP Engine for generating reads and writes over the central system bus for carrying out various tasks, such as: (1) setting the control bit in the Info Block Controller to enable access to the Info Block; (2) reading the address part and the data part, and writing data contained in the data part into a memory location specified in the address part; and (3) setting the write-once bit in the Info Block Controller to enforce a write protection policy on the Info Block, wherein the assertion or de-assertion of the write-once bit is based on the configuration data stored in the Info Block.

In an aspect, the OTP Engine functions as a state machine, which performs or signals other components to perform specified tasks depending on the state it operates in. Also, in some embodiments, the Info Block is implemented in an erasable flash memory by using the OTP Engine and its associated control logic. In one particular embodiment, the flash memory controller implements both the Info Block Controller as well as the OTP Engine described herein.

Additional advantages and features will become readily apparent in view of the following detailed description of the invention.

BRIEF DESCRIPTION OF THE DRAWINGS

The drawing figures described below set out and illustrate a number of exemplary embodiments of the claimed invention. Throughout the drawings, like reference numerals refer to identical or functionally similar elements. The drawings are illustrative in nature and are not drawn to scale.

DETAILED DESCRIPTION

The following detailed description is made with reference to the figures. Exemplary embodiments are described to illustrate the claimed invention, not to limit its scope, which is defined by the appended claims.

Overview

Methods and systems for implementing extensible hardware device configuration using memory are described herein. In particular, methods and systems for implementing an extensible OTP Engine adaptable to changes in configuration requirements are described. Embodiments of the methods and systems described herein use generic address/data pair to provide SoC configuration data. This feature enables the OTP Engine to configure any registers in the device, not just the ones pre-selected at the design time. Further, using the generic address/data pair in conjunction with a standard system bus interconnecting all components of a system in a single address space allows the OTP Engine to be designed independently of a specific memory organization or configuration requirement.

In this disclosure, the terms "configuration information" and "configuration data" are used interchangeably to refer an instruction or a set of instructions that controls functions of a SoC. In some embodiments, one-time programmability is emulated using a non-volatile memory, such as flash memory. In alternative embodiments, a read-only memory (ROM) is used to store the configuration information/data.

As used herein, the term "Info Block" refers to any memory components that store configuration data, including flash memory, ROM, or any other type of memory structure currently known or may be developed later. Also, the term "Info Block Controller" refers to a logic controlling access to the Info Block, which can be implemented in hardware, software, or in a combination of both. Further, the term "controller" in this disclosure refers to any type of processor or controller, such as a central processing unit (CPU), an embedded controller, a direct memory access (DMA) controller, a state machine or any combination thereof. Moreover, the term "unauthorized components" have been used in various embodiments described herein.

In this disclosure, the "unauthorized components" refers to generally and broadly to any components, either internal or external, that are configured not to have access to the Info Block prior to the completion of configuration processes described herein. For example, a flash memory controller can be an unauthorized component in one embodiment, but the same might not be true in another embodiment where the flash memory controller functions as the Info Block Controller.

Figure 1:
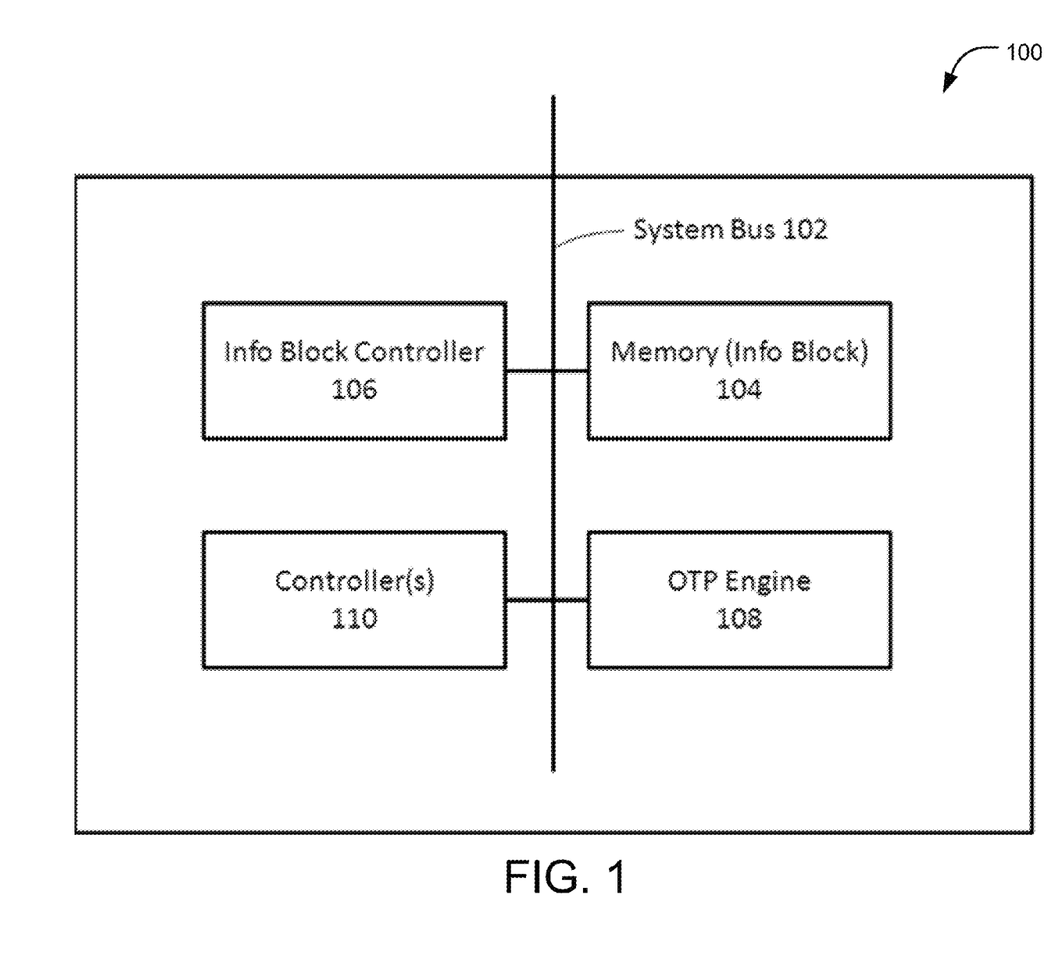
FIG. 1 is a block diagram illustrating an exemplary System-on-Chip (SoC) configured to implement one embodiment of the present disclosure.

One exemplary embodiment of the present disclosure is a SoC 100 depicted in FIG. 1. In this embodiment, a SoC 100 utilizes a system bus 102 that interconnects all components of the SoC 100, allowing all registers of the components to be accessible in a single memory address space. The components coupled to the system bus 102 includes a memory containing an Info Block 104 that stores configuration data; an Info Block Controller 106 for controlling access the Info Block 104; an OTP Engine 108 for emulating typical OTP memory with its associated configuration logic; and a controller 110 for executing program codes/instructions. While a controller 110 may also function as an Info Block Controller 106, the controller 110 and the Info Block Controller 106 are illustrated as discrete components in FIG. 1 for the purposes of simpler explanations. In some embodiments, the system bus 102 can facilitate communication with systems or components external to the SoC 100. The exemplary SoC 100 can be incorporated into any type of components or devices, such as a network interface integrated circuit, MP3 player, and the likes.

The Info Block 104 stores the configuration data for the SoC 100. Examples of the configuration data contemplated for storage in the Info Block 104 include device security information, pre-execution device configuration data, and/or any other data/information that should be protected from unauthorized tampering. The configuration data in the Info Block 104 is organized as a sequence of "descriptors," each containing an address part and a data part. In operation, the data parts of the descriptors are written to the memory locations specified in the corresponding address parts, thereby configuring the SoC 100. This process is referred hereinafter as "latch" or "latching" in the remainder of this disclosure. The specified memory location may be a volatile memory, such as static random access memory (SRAM) and volatile registers, as well as a non-volatile memory such as a flash memory.

Not all data in the Info Block contain useful data for configuring the SoC 100. Therefore, each descriptor read must be validated before its data part latches to the specified memory location. A descriptor can be defined as valid in a number of ways. For example, the first location in the Info Block 104 can be configured to store a total number of valid descriptors, and the latching operation can continue sequentially based on the count of descriptors. In some cases, each descriptor can contain a valid bit, and only the data from descriptors with a valid bit are latched. Moreover, each descriptor can be configured to contain a "sentinel" bit, which signals the OTP Engine 108 to terminate the latching operation.

The OTP Engine 108 is a state machine that generates reads and writes on the system bus 102 to emulate an OTP memory by controlling access to the Info Block 104. For example, upon power-cycling the SoC or receiving a reset signal, the OTP Engine 108 sends hold signals for engaging a reset mode to all unauthorized components of the SoC. When the unauthorized components are in the reset mode, they become temporarily inoperable, and thus unable to access the Info Block 104. In FIG. 1, the Controller 110, which is distinct from the Info Block Controller 106, is an unauthorized component held in a reset mode while the SoC configuration takes place. In contrary to the Controller 110, the Info Block Controller 106 is a controller dedicated to control access on the Info Block depending on the configuration data. Accordingly, the Info Block Controller 106 contains control bit(s) in a register that grants access to the Info Block 104 via either a register or a memory interface. The OTP Engine 108 sends a signal for setting the control bit(s) in the Info Block Controller 106 via the system bus 102, thereby allowing the Info Block Controller 106 to prepare the Info Block 104 for the subsequent latching operation.

When all valid descriptors are read and the configuration data are properly latched to the specified memory location, the OTP Engine 108 sets a write-once bit in the registers of the Info Block Controller 106 via the System Bus 102. In contrast to the control bit(s) that control the access (e.g., read and write) to the Info Block 104, the write-once bit configures the Info Block Controller 106 to prohibit any further write operation on the Info Block 104. To prevent possible reverse engineering of the configuration data in the Info Block 104, the OTP Engine 108 can reset the control bit of the Info Block Controller 106 to prohibit all access to the Info Block 104. Once the write-protection mechanism is placed on the Info Block 104, all unauthorized components are released from the reset mode to execute instructions for further configuring the device or to carry out other functions as appropriate. Note that, by the time the unauthorized components are released from the reset/off mode, the Info Block 104 is no longer modifiable or accessible by those unauthorized components.

As will be discussed in detail below, the configuration of the write-protection mechanism is built into the configuration data in the Info Block 104. In other words, the assertion of the write-once bit and its subsequent effects on the Info Block 104 are dictated by the configuration data stored in the Info Block 104. This feature facilitates experimental devices with unlocked configuration data to be used repeatedly by developers for device characterization and testing.

In some other embodiments, the configuration data is stored in a ROM, which is inherently non-erasable and non-rewritable. Further, in some embodiments, the functionality of the Info Block Controller 106 and the OTP Engine 108 may be combined into a single component. Furthermore, the operations described above may be performed concurrently, in a different order, or may be omitted. Additional operations may also be performed as appropriate.

Figure 2:
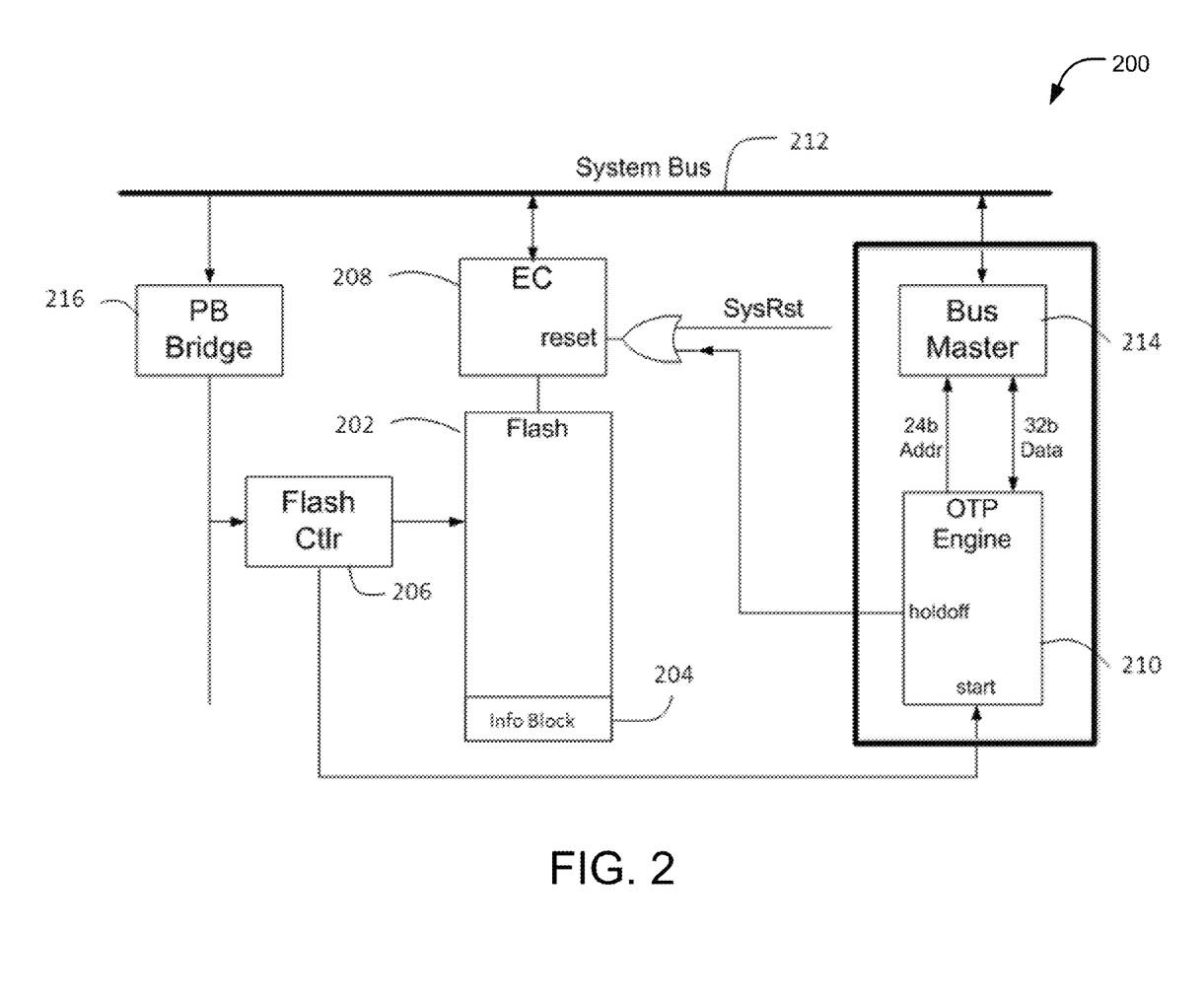
FIG. 2 is a block diagram illustrating an exemplary system for implementing extensible hardware device configuration, according to an embodiment, wherein the Info Block is prepared in erasable flash memory and the flash memory implements Info Block Controller.

FIG. 2 is a block diagram illustrating an exemplary SoC 200 configured to implement functions described above, in accordance with an embodiment of the present disclosure. In this embodiment, a flash memory 202 emulates OTP memory to provide a non-volatile and un-modifiable memory location for storing the configuration data. More specifically, certain part(s) of the flash memory 202 is reserved for OTP functionality, which is denoted as "Info Block" 204 as shown in FIG. 2. Depending on the assertion of a write-once bit, the configuration data can be written on the Info Block 204 once, and only once, at least without having to erase the entire flash memory 202. The Info Block 204 can be implemented in any location of the flash memory 202, for example, the last set of words in the flash memory 202, the last word in the first block, and so forth as appropriate. In preferred embodiments, however, the Info Block 204 is implemented at a fixed location depending on the particular SoC design.

The Flash Memory Controller 206 is coupled to the Flash Memory 202 to manage read and write operations. In this embodiment, the Flash Memory Controller 206 functions as the Info Block Controller 106 of FIG. 1. Accordingly, the Flash Memory Controller 206 contains control bits in its register dictating access to the Info Block 204. In addition, the Flash Memory Controller 206 also contains a write-once bit or set of bits in registers that, once written, disables the first bit or bits, which emulates OPT functionality on the Info Block 204. In some other embodiments, however, any other components or peripheral blocks capable of controlling access to the Info Block 204 may function as the Info Block Controller.

Further, an Embedded Controller (EC) 208 is also coupled to the Flash Memory 202 to read and write data to the non-Info Block parts of the Flash Memory 202. In some cases, however, the EC 208 may have access to the Info Block 204 depending on the control bit and/or the write-once bit in the registers of the Flash Memory Controller 206. Accordingly, if necessary, the EC 208 can operate to write configuration data into the Info Block 204 that triggers the write-once bit of the Flash Memory Controller 206 the next time the Flash Memory Controller 206 runs, which would inhibit any further writes to the Info Block 204. Similarly, other peripheral controllers may read and write data to the Info Block 204 so long as the write-once bit and the control bit allow so. Furthermore, any data that are latched to the specified memory location may be accessed by the EC 208, or any other system or sub-system, as appropriate.

The OTP Engine 210 controls the implementation and operation of OTP functionality with respect to the Info Block 204. In this embodiment, the OTP Engine 210 is configured to perform tasks corresponding to certain state in which the OTP Engine 210 operates in. For example, the OTP Engine 210 includes a first state or "INIT" state, in which the unauthorized components, including EC 208, are held in reset/off mode. In this state, the Info Block Controller, such as the Flash Memory Controller 206, is configured to permit access to the Info Block 204. The OTP Engine 210 also includes a second state or "READ/WRITE" state, in which the unauthorized components are held in reset/off mode, and the configuration data are read and latched into the specified memory locations. The OTP Engine 210 further includes a third state or "IDLE" state, in which the unauthorized components are released from the reset/off mode.

As mentioned, the OTP Engine 210 in embodiments described in the present disclosure utilizes, the first, second, and third states that are denoted as INIT, READ/WRITE, and IDLE, respectively. It should be understood that these states are meant to be illustrative of the OTP Engine 210 and not to limit as to the particular number and type of states contemplated. Accordingly, in some other embodiments, the OTP Engine 210 may operate with a less or more number of states as appropriate. Moreover, the OTP Engine 210 may be implemented as hardware, software, or a combination of both. Furthermore, while the OTP Engine 210 is illustrated as a discrete standalone component in FIG. 2, the OTP Engine in some other embodiments may be implemented as a part of another component in the SoC 200. For example, a flash memory controller 206 or any other peripheral block may implement the functionality of the OTP Engine 210. Also, in some other embodiments, a combination of several components in a SoC 200 may be used to implement the functionality of the OTP Engine 210. For instance, one component can implement certain functionality of the OTP Engine 210, while another component implements another functionality of the OTP Engine 210.

An important aspect of an SoC 200 design is not only the type of components it integrates, but also how they are interconnected. The exemplary environment utilizes a central system bus 212 for interconnecting all components in the system, so that all registers are accessible in a single common memory address space. In addition to facilitating the inter-component communication within the SoC 200, the central system bus 212 may also provide a medium for communication between systems or components external to the SoC 200. One example System Bus Architecture is Advanced Microprocessor Bus Architecture (AMBA) developed by Arm, Ltd. When such system bus architecture is used, a Bus Master 214 can generate reads and writes to memory addresses or registers located outside the system bus address space. As shown in FIG. 2, in some embodiments, a peripheral bridge (PB Bridge) 216 can be used to connect the system bus 212 to peripheral components or blocks of the system, such as the Flash Memory Controller 206. As described above, the OTP Engine 210 controls access on the Info Block 204 by configuring the registers of the Flash Memory Controller 206 via the central system bus 212, and the PB Bridge 216 provides means for accessing registers in peripheral blocks. Such implementation enables the OTP Engine 210 to be designed independently of a specific memory organization or configuration requirements.

Figure 3:
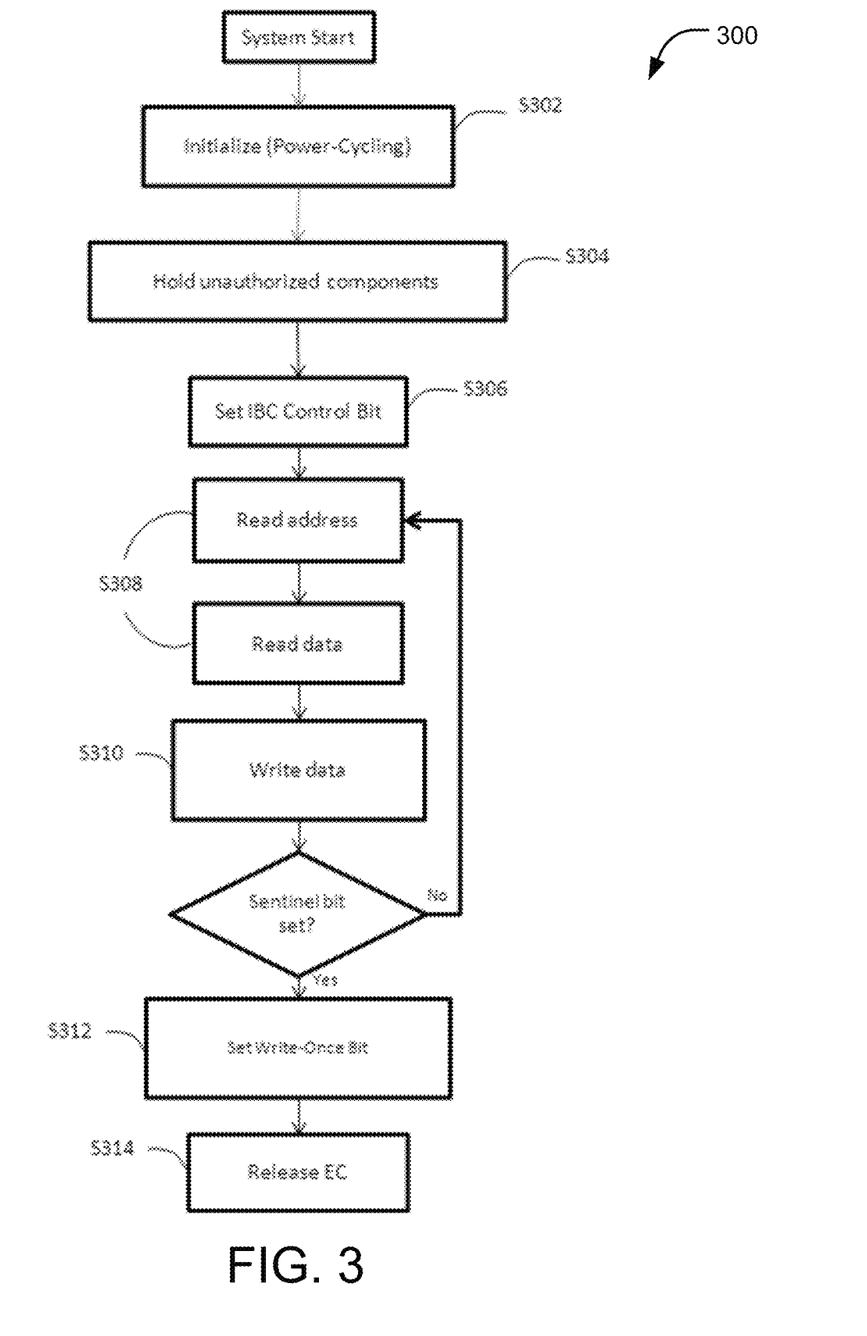
FIG. 3 is a flowchart of a method for implementing extensible hardware device configuration using memory, according to an embodiment of the present disclosure.

FIG. 3 is a flowchart of a method for implementing an extensible hardware device configuration using memory, according to an embodiment of the present disclosure. For the purposes of explanation, various embodiments of method will be described with reference to the exemplary system 200, but they are not necessarily limited to the structure of the system 200. In this exemplary routine 300, the Flash Memory Controller 206 implements the Info Block Controller. In other embodiments, however, the Info Block Controller may be a discrete standalone component of the system or a part of another component. In various embodiments, some of the steps described may be performed concurrently, in a different order, or may be omitted. Additional steps may also be performed as appropriate.

In S302, the system may be power-cycled (e.g., powering off and back on the device) to ensure that the device starts to operate in a known state. In some embodiments, a system reset signal such as power-on reset (POR), can provide the same effect as power-cycling the device. When the system is power cycled, the OTP Engine 210 may enter into the first—INIT—state, which initializes the Flash Memory Controller 206 to read the Info Block 204. For example, an address input to the flash memory array may be initialized for starting a read at the address of the Info Block 204, and volatile memory or registers may be prepared to latch the read data.

In S304, unauthorized components are held in the reset/off mode until the OTP Engine 210 completes the configuration of the SoC. This step is taken to eliminate any opportunity of using the unauthorized components to circumvent the OTP aspects of the Info Block 204. As shown in FIG. 2, the "Hold off" signal from the OTP Engine 210 and the system reset signal are passed through an OR gate. In this case, either signal will cause the EC 208 to be in the reset/off mode, thereby preventing it from accessing the Flash Memory 202.

Referring back to FIG. 3, in S306, the OTP Engine 210 sets the control bit(s) in the registers of the Flash Memory Controller 206 to access the Info Block 204 and read the configuration data. As mentioned earlier, the system bus 212 interconnects all components of the SoC, either directly or indirectly using the PB bridge 216, thereby providing a single address space. The central system bus 212 can be one of the AMBA bus architecture, such as Advanced High-performance Bus ("AHB") or Advanced eXtensible Interface ("AXI"), or any other system bus that allows all registers of components in the system to be accessible in a single common address space. In this particular example, the address space of the system bus 212 is 24 bits, and the data size is 32 bits. The Bus Master 214 coupled to the system bus 212 can generate reads and writes to memory or register addresses located elsewhere on the system bus address space. Also, the PB Bridge 216 functions as a bridge connecting various components and peripheral blocks to the system bus 212, thereby enabling the OTP Engine 210 to provide access to all registers in the system.

In response to the Info Block 204 being accessible, the OTP Engine 210 enters into the second state—READ/WRITE state—in which the OTP Engine 210 or another dedicated Info Block Controller latches the configuration data into the volatile memory or volatile registers. More specifically, in S308, the OTP Engine 210 receives a ready signal from the Flash Memory Controller 206 and the OTP Engine 210 initiates reading the configuration data from the Info Block 204. As mentioned above, the Info Block 204 is organized as a sequence of "descriptors," each containing a system bus address part as well as a data part. For each valid descriptors read from the Info Block 204, the OTP Engine 210 writes the data part into the memory location defined by the address part.

Figure 4:
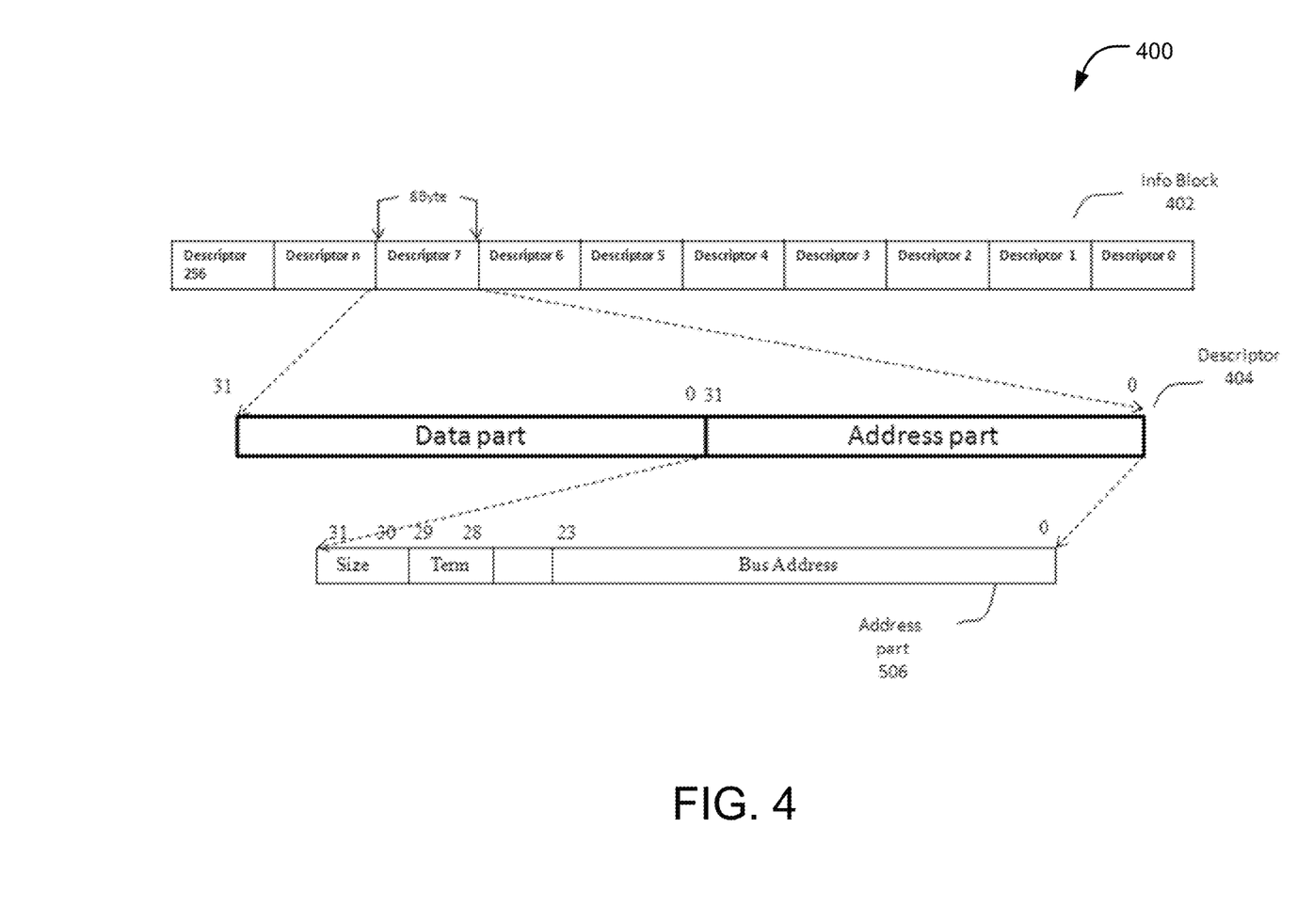
FIG. 4 illustrates an exemplary Info Block structure, according to an embodiment of the present disclosure.

FIG. 4 is an illustration of an exemplary Info Block structure 400 according to an embodiment of the present disclosure. In this example, a 2 KB Info Block 402 contains 256 of 8-byte descriptors. Each descriptor 404 contains a 32-bit address portion and a 32-bit data portion. In S308 of FIG. 3, the OTP Engine 210 starts reading descriptors out of the Info Block 402 starting with descriptor 0, and continues until the sentinel bit in a descriptor indicates that it's the last descriptor of the configuration data. As illustrated in FIG. 4, the address part 406 of a descriptor 404 contains three data fields: a 24-bit Address, a 2-bit Size field, and a 2-bit Termination (Term) field. The Size field can be set to "00", "01", and "10", and it can be interpreted as 32-bit write, 8-bit write, and 16-bit write, respectively. In addition, the Size field can also be set to "11," which is reserved for discarding the 32-bit data part of the corresponding descriptor. Accordingly, in S310, for each valid descriptor, the OTP Engine 210 reads the data part and performs an 8, 16, or 32 bit write over the system bus 212 at the address specified in the address part of the descriptor.

The OTP Engine 210 is operates in the second—READ/WRITE—state until the configuration data from all valid descriptors are read and latched. In some embodiment, the OTP Engine 210 may be held in the second—READ/WRITE—state for a time interval determined to be at least long enough to complete the read from the Info Block 204. In an embodiment, the time interval can be hard-coded in the configuration data. In another embodiment, however, the time interval may be a dynamic variable that can adapt to a variety of factors/conditions of the system. Factors/Conditions may include components being utilized in the system, type of memory used for latching, and/or any other system requirements that affects the duration of configuring the system. In alternate embodiments, the system can be configured to detect the completion of the read operation by the OTP Engine 210. In one embodiment, the first location in the Info Block 204 can contain a count of the number of valid descriptors, which the OTP Engine 210 can count descriptors sequentially in the Info Block 204. In another embodiment, the OTP Engine 210 can be configured to read all potentially valid descriptors and act upon the descriptors having a valid bit set. As discussed earlier, in a preferred embodiment, each descriptor contains a sentinel bit, which can be used to terminate the latching operation and to cause the OTP Engine 210 to move on to the next state. As shown in FIG. 4, the address part of each descriptor may contain a Termination (Term) field. The Term field containing the sentinel bit can be set to either "x0" to indicate that additional descriptor exists in the Info Block 402, or "x1" to indicate that the current descriptor is the last entry in the Info Block 402.

In S312, the OTP Engine 210 sets the write-once bit in the registers of the Info Block Controller over the system bus 212. The PB Bridge 216 or any other interfaces for managing the connection between the system bus 212 and peripheral blocks may be used to access the registers of the peripheral blocks. In the example discussed above, when the Term field of a descriptor contains "x1," the OTP Engine 210 writes the 2-bit Term field of the last descriptor into the register in the Flash Memory Controller 206 to configure the Flash Memory Controller 206. Referring to FIG. 2 and FIG. 4, bit 29 in the address part of the last valid descriptor is written into the write-once bit in the Flash Memory Controller 206. When the write-once bit is set, the Info Block 204 becomes un-writable by any internal or external function unit. If Bit 29 is "0," the write-once bit in the Info Block 204 is also set to "0" and the Info Block 204 is accessible by the Flash Memory Controller 206 or the EC 208 to reprogram the configuration data. In contrast, when Bit 29 is "1," the Info Block 204 is locked for any further modification. Accordingly, the assertion of the write-once bit and the control bit emulates the one-time programmability of a typical OTP memory.

As explained above, the write-protection mechanism on the Info Block 204 is dictated by the configuration data in the Info Block 204 itself. Accordingly, experimental devices with unlocked configuration data can be used repeatedly in the lab for device characterization and testing. Moreover, the Info Block 204, if implemented in a flash memory, can be erased and reprogrammed. This feature makes the system adaptable to configuration requirement changes. For example, a SoC configured for one part can be retargeted for another part of a device.

In S314 of FIG. 3, the OTP Engine 210 enters into the third—IDLE—state after it completes the configuration of the system. In this state, the OTP Engine 210 sends signals over the system bus 212 to release the EC 208 to allow executing instructions for further configuring the device or to carry out other functions.

Note that the latched data cannot be changed under software control because its input comes only from the configuration data read by the OTP Engine 210. In addition, the OTP Engine 210 operations described above are performed in response to a power-cycle or a system reset, and unauthorized components of the system, such as EC 208, are held off while the OTP Engine 210 completes configuring the SoC, including placing a write-protection on the Info Block 204. Accordingly, unauthorized components never have an opportunity to circumvent the OTP aspect of the Info Block 204.

Figure 5:
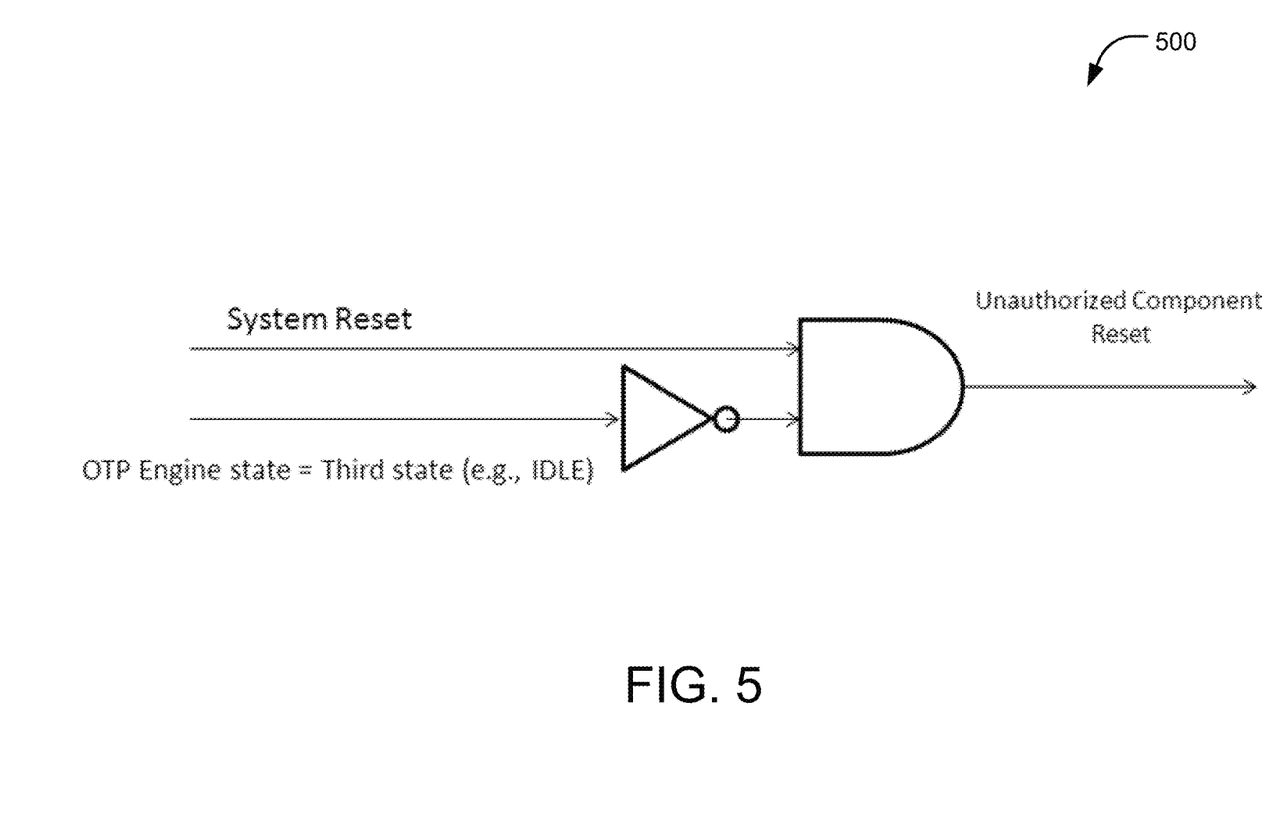
FIG. 5 illustrates an exemplary system logic for holding unauthorized components/controllers in reset, according to an embodiment of the present disclosure.

FIG. 5 illustrates an exemplary system 500 logic for enforcing the unauthorized components in reset, according to an embodiment. As shown in FIG. 5, the system reset signal and the inverse or negation of the signal indicating the OTP Engine 210 being in the third—IDLE—state are passed through an OR gate. Accordingly, either the system reset or the OTP Engine 210 not being in the idle state will cause the unauthorized components to be in reset. Conversely, when system reset is not asserted and the OTP Engine 210 is in IDLE state, the components can operate normally according to the limitation set by the write-once bit. The implementations for holding the unauthorized components in reset described herein are meant to be exemplary only, and it should be anticipated that ongoing technological development will change the manner in which particular functions are performed.

In various embodiments, the write-once bit may be used to enforce different OTP functionalities with respect to the Info Block implemented in the flash memory. For example, in one embodiment, the flash memory may not be erased at all after asserting the write-once bit. In another embodiment, the Info Block may be erased even after asserting the write-once bit, but only by clearing the entire flash memory, thereby protecting any proprietary information stored in the Info Block. In yet another embodiment, the write-once bit enforces write protection on the Info Block only, thereby allowing other parts of the flash memory to be erased. For enhanced security, in some embodiments, the OTP Engine may reset the control bit(s) in the Info Block Controller prior to releasing the other components from reset, so that the Info Block becomes inaccessible.

In the embodiments described herein, the OTP Engine operates with generic address/data pairs, as opposed to just data, to provide configuration data to the system. With this setting, not only can the OTP Engine configure the registers pre-selected at the SoC design phase, but it can configure all registers of the system even if the system requirement changes. Even in the design phase, special purpose configuration hardware does not have to be designed, because varying the configuration strategy for even a very different device is a matter of programming rather than redesigning the hardware. The specifics of configuration are stored in the Info Block, and thus the same OTP Engine itself can be reused on different devices with minimal or no modification at all. Moreover, the OTP Engine described herein uses standard bus accesses to interact with the Info Block Controller, and therefore it does not have to be redesigned even if the Info Block is replaced with a technology from a different vendor.

The specification has described a system and method suitable for implementing an extensible hardware configuration using memory. The invention is not limited to these examples. Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

We claim:

1. A method for implementing an extensible hardware device configuration of a system using memory, comprising: configuring an Info Block Controller, via a central system bus, to permit access to memory comprising an Info Block storing configuration data of the system, wherein the Info Block can be controlled to be unmodifiable, wherein the Info Block comprises a plurality of descriptors organized in a sequence, each containing an address part and a data part, and wherein the central system bus has a single memory address space; and reading a memory address and a data from the address part and the data part, respectively, of each valid descriptor, and writing the obtained data to the corresponding memory address via the central system bus, wherein the corresponding memory address includes one or more volatile registers and wherein said each descriptor contains a 32-bit address art and a 32-bit data part, and wherein the address art contains a 24-bit address field, a 2-bit size field, and a 2-bit termination field.

2. The method of claim 1, further comprising: holding unauthorized components in reset before configuring the Info Block, to permit access to the Info Block; and releasing the unauthorized components from reset after configuring the Info Block Controller to prohibit subsequent writes to the Info Block.

3. The method of claim 2, wherein the configuring the Info Block Controller to permit access to the Info Block, an One Time Programmable (OTP) Engine asserts one or more control bits in one or more registers of the Info Block Controller, via the central system bus.

4. The method of claim 3, wherein the Info Block is implemented using a modifiable memory, and the method further comprises configuring the Info Block Controller, via the central system bus, to enforce one or more of write protection policy on the info Block.

5. The method of claim 4, wherein the OTP Engine configures the Info Block Controller to enforce one or more of the write protection policy on the Info Block by asserting one or more write-once bits in one or more registers of the info Block Controller, via the central system bus.

6. The method of claim 5, wherein asserting the write-once bit enforces at least one or more of following write-protection policies: deny any subsequent write or delete operations on the entire modifiable memory; deny any subsequent delete operation on the Info Block without deleting the entire modifiable memory; and deny any subsequent write or delete on the Info Block, but allow all subsequent operations on remainder of the modifiable memory.

7. The method of claim 6, further comprising: in response to asserting the write-once bit, reasserting the control bit in the register of the Info Block Controller to deny any subsequent access to the Info Block.

8. The method of claim 3, wherein the Info Block is implemented in a read-only memory, and wherein the OTP Engine asserts one or more write-once bits in one or more registers of the Info Block Controller, via the central system bus, to prevent any subsequent access to the Info Block.

9. The method of claim 1, wherein the termination field contains a sentinel bit, when set, causes an OTP Engine to terminate reading the descriptors from the Info Block.

10. A system for implementing extensible hardware configuration of the system using memory, comprising:
a central system bus for connecting all components of the system, wherein the central system bus is configured to provide a single memory address space;
a memory coupled to the central system bus, wherein the memory contains an Info Block comprising a plurality of descriptors organized in a sequence, each containing an address part and a data part for configuring the system, wherein said each descriptor contains a 32-bit address part and a 32-bit data part, and wherein the address part contains a 24-bit address field, a 2-bit size field, and a 2-bit termination field;
an Info Block Controller coupled to the central system bus, wherein the Info Block Controller contains at least one control bit in at least one register for controlling access to the Info Block, and at least one write-once bit for controlling a write-protection policy on the Info Block;
and an one time programmable (OTP) Engine for generating reads and writes over the central system bus configured:
to set the control bit in the Info Block Controller to enable access to the Info Block; for each valid descriptor stored in the Info Block,
to read the address part and the data part, and
to write data contained in the data part into a memory location specified in the address part; and
to set the write-once bit in the Info Block Controller to enforce a write protection policy on the Info Block, wherein the assertion or de-assertion of the write-once bit is based on the configuration data stored in the Info Block.

11. The system of claim 10, wherein the memory location specified in the address part of the descriptor includes volatile memory.

12. The system of claim 10, wherein the OTP Engine, in response to power-cycling the system and prior to enabling access to the info Block, holds unauthorized components of the system to hold in reset; and releases the unauthorized components after the write-once bit in the Info Block Controller is set.

13. The system of claim 10, wherein the memory is a read-only memory.

14. The system of claim 10, wherein the memory is an erasable flash memory, and wherein a flash memory controller implements the info Block Controller and the OTP Engine.

15. The system of claim 10, wherein the descriptors are defined as valid by at least one of following circumstances, comprising: providing the Info Block containing a count of valid descriptors, and the OTP Engine counts descriptors sequentially in the Info Block; providing the descriptors, each containing a valid bit, and the OTP Engine reads all descriptors, but only operate on the descriptor with the valid bit set; and providing the descriptors, each containing a sentinel bit, and the OTP Engine terminates upon reaching the descriptor with the sentinel bit set.

16. The system of claim 10, wherein the OTP Engine operates in a plurality of states, comprising: a first state, in which the OTP Engine: holds unauthorized components of the system in reset; and sets the control bit in the Info Block Controller to enable access to the Info Block; a second state, in which the OTP Engine: for each valid descriptor stored in the Info Block, reads the address part and the data part, and writing data contained in the data part into a memory location specified in the address part; and sets the write-once bit in the Info Block Controller to enforce a write protection policy on the Info Block, wherein the assertion or de-assertion of the write-once bit is based on the configuration data stored in the Info Block; and a third state, in which the OTP Engine: releases the unauthorized components from reset.

17. The system of claim 16, wherein the OTP Engine enters into the first state upon power-cycling the system, the second state upon receiving a signal from the Info Block Controller indicating that the Info Block is ready for read, and the third state upon setting the write-once bit in the Info Block.

18. A method for implementing extensible hardware device configuration using memory, comprising: in response to power-cycling a system, holding off unauthorized components; asserting a control bit to an Info Block Controller, via a central system bus having a single memory address space, thereby configuring the Info Block Controller to permit access to an Info Block, wherein the Info Block comprises a plurality of descriptors, each containing a 32-bit address part and a 32-bit data part, and wherein said address part comprises a 24 bit address field, a 2-bit size field, and a 2-bit termination field; obtaining a memory address and a data from the address part and the data part of each valid descriptor, respectively, and writing the obtained data to the corresponding memory address via the central system bus; asserting a write-once bit to the Info Block Controller, via the central system bus, thereby configuring the Info Block Controller to prohibit subsequent writes to the Info Block; and releasing the unauthorized components from reset.

* * * * *

UNITED STATES PATENT AND TRADEMARK OFFICE
CERTIFICATE OF CORRECTION

| | | |
|---|---|---|
| PATENT NO. | : 9,015,437 B2 | Page 1 of 1 |
| APPLICATION NO. | : 13/406533 | |
| DATED | : April 21, 2015 | |
| INVENTOR(S) | : Alan Berenbaum et al. | |

It is certified that error appears in the above-identified patent and that said Letters Patent is hereby corrected as shown below:

In the Claims

Column 11,
Claim 1, line 5, "...address art and a 32-bit data part, and wherein the address art..."
---Change to--- "...address part and a 32-bit data part, and wherein the address part..."

Signed and Sealed this
Twenty-eighth Day of July, 2015

Michelle K. Lee
*Director of the United States Patent and Trademark Office*